June 1, 1943.   G. GERALDSON   2,320,968
QUICK DETACHABLE COUPLING
Filed Aug. 8, 1941

INVENTOR.
Gerald Geraldson
BY
Emerson B. Llomell
Attorney

Patented June 1, 1943

2,320,968

UNITED STATES PATENT OFFICE 2,320,968

QUICK DETACHABLE COUPLING

Gerald Geraldson, Rockford, Ill., assignor to J. I. Case Company, Racine, Wis., a corporation Application August 8, 1941, Serial No. 406,042

12 Claims. (Cl. 280—33.15)

The following specification relates in detail to a quick detachable coupling for agricultural implements. In drawing cultivators or like implements by means of tractors it is necessary to provide means for promptly and readily attaching and detaching the cultivator from the tractor. This operation is required by the necessity for disconnecting the agricultural implement at the conclusion of the work or temporarily. It also happens that frequently it is necessary to substitute one implement for another.

My invention provides simple, rugged and economical means for interchangeably and detachably connecting agricultural implements to a tractor.

One of the objects of my invention is to provide a draft connection in which the pull is exerted without developing any tendency for inadvertent detachment of the implement from the tractor.

A further object of my invention is to insure the proper position of the implement laterally with respect to the tractor to which it is connected.

A still further object of my invention is to provide means by which the parts when in operative position are inseparably connected.

A still further object is to provide such a device in which the connection of the implement to the tractor is pivotal in character.

With these and other objects in view, I have shown the preferred form of my invention by way of example on the accompanying drawing in which.

Agricultural tractors which form the motive power for a great variety of agricultural implements customarily include a rear axle housing 4, one end of which carries a wheel 5 which is commonly, although not necessarily rubber tired, while the other end merges with the housing 6 of the differential gear.

The rear axle housing 4 being a fixed generally cylindrical metal part forms the support upon which my novel coupling means is mounted. This coupling means includes a pair of loose collars or fittings 7—7. These collars may slide along the housing 4 and be clamped tightly to the latter in any convenient relative position by means of the adjusting bolts 8—8. In this way the collars are permanently attached to the housing 4 and any suitable spacing between the collars may be provided to accommodate any agricultural implement which it is desired to couple to the tractor.

Figure 3:
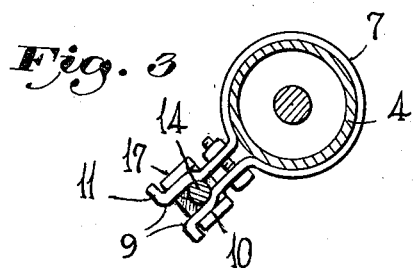
Fig. 3 is a vertical cross-section on the line 3—3 of Fig. 1.

As more particularly shown in Fig. 3 the ends of the clamping collars 7 are extended to form a pair of jaws 9—9. Each jaw 9 has an outward bend 10. These bends form a recess of a size suitable to receive and hold a draft bar. Beyond the recesses 10, the jaws 9 are sharply out-turned as shown at 11 thus providing abutments for transmitting the draft, to the attached implement, as will appear.

While jaws 9—9, in the preferred embodiments, are clamped to housing 4, it is contemplated that they might be integrally fastened or for example welded to the axle housing or other tractor part within the scope of the invention.

I have shown by way of example in the drawing a tongue 12, the two parts of which extend forwardly to form eyelets 13 and 13$^a$. These eyelets carry a transverse round draft bar 14. The bar 14 is of suitable length to extend beyond the jaws 9—9 and to receive locking means. Closely around draft bar 14 and on opposite sides of the eyelet 13 are two collars 15—15. These collars are adjustably positioned by means of set screws 16 and provide for limiting or preventing lateral movement of the tongue 12.

There is sufficient space between the collars 15 and the adjacent jaws 9 to permit lateral shifting or adjustment of the position of the tongue 12.

Draft bar 14 may extend outwardly beyond the end 4$^a$ of axle housing 4 to provide an anchorage for eyelet 13$^a$ opposite a portion of the tractor axle as 4$^b$ which is rotatable, and accordingly not adaptable to carrying a collar such as 7. In this way a wider spacing of eyelets 13 and 13$^a$ may be obtained than would otherwise be possible.

Figure 1:
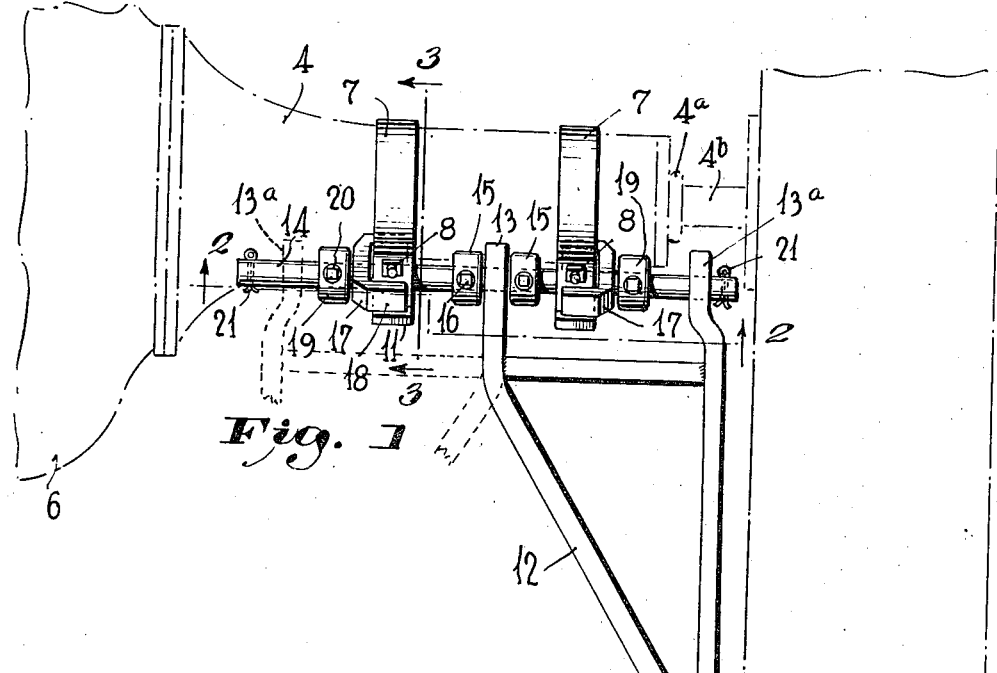
Figure 1 is a plan view of the improved coupling and the associated parts of a tractor and an agricultural implement.

Furthermore, with the structure disclosed, tongue 12 may be turned over, or reversed, so that eyelet 13$^a$ may engage the left end of draft bar 14, as seen in Fig. 1, and also the parts can be arranged so that eyelet 13$^a$ occupies the space between collars 15—15 and eyelet 13 engages the left end of draft bar 14.

Beyond the collars 7—7 each end of the draft bar 14 carries a slidable C-clamp or locking member 17. Each clamp has a pair of parallel extensions 18 spaced sufficiently to fit around the jaw 9. This is illustrated more particularly in Figs. 1 and 2.

Beyond each C-clamp 17 the bar 14 carries a locking collar 19—19. These collars are also locked in position by means of set screws 20—20.

The ends of the bar 14 carry cotter pins 21—21 or similar devices which serve as stops to prevent the collars 19 and C-clamps 17 from being inadvertently slipped off of the bar.

The collars 7 are adjusted on the axle 4 so that suitable space is provided between them to receive the eyelet 13 and the collars 15—15. As shown in Fig. 3 the jaws 9 of the collars 7 extend downwardly and to the rear of the axle. This makes it easy to effect the engagement with the draft bar 14.

With the collars 19—19 and the C-clamps 17—17 retracted toward the ends of the draft bar 14, the latter may readily be placed between the jaws as shown in Fig. 3. The tongue 12 and its eyelets 13 and 13ª are free to swing to suit the condition of the ground over which they travel, but the lateral position of the parts is substantially fixed, if desired, by the position of collars 15—15.

Figure 2:
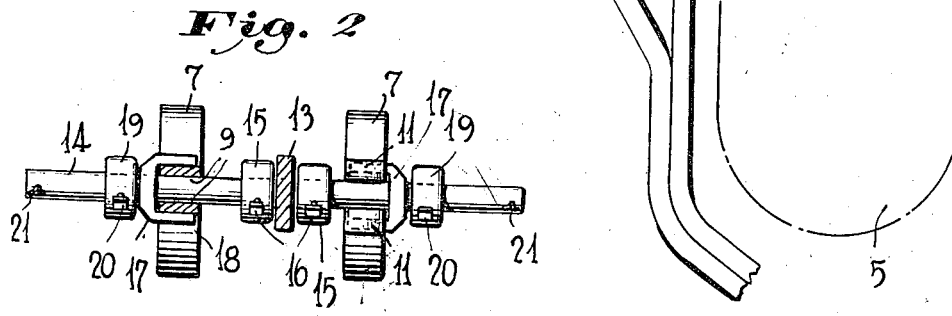
Fig. 2 is a rear elevation partly in section on the line 2—2 of Fig. 1.

C-clamps 17—17 are brought inward over the jaws 9 into the position shown in Figs. 1 and 2. Lock collars 19 then prevent outward movement of the C-clamps. In this position the clamps fit closely around jaws 9 and engage out-turned end portions 11 to receive the draft of the tractor and transmit it to draft bar 14. Clamps 17 prevent jaws 9 from spreading to release the draft bar 14. In effect the draft bar 14 and jaws 9 are thus made parts of a fixed coupling not subject to detachment.

It is a simple matter to unfasten locking collars 19 and in a moment's time release the C-clamps 17 from jaws 9 so that draft bar 14 may be withdrawn from the jaws and replaced, if desired, by the draft bar of another implement.

From the above description of my preferred form of the invention it will be apparent that I have provided in the collars 7 a simple device which may be permanently a part of the tractor and serve effectively for the ready attachment of a great variety of implements. The draft bar 14 with its associated parts including the tongue of the agricultural implement forms the other part of the coupling. The attachment of the draft bar to the tractor is facilitated by the form of the clamping jaws and the two parts inseparably connected by means of the C-clamps 17—17.

While I have illustrated one form of my invention it will be apparent to any one skilled in the art that slight changes in design, proportions, materials and individual elements may be carried out without in any way departing from the spirit of the invention and its scope as defined in the following claims.

What I claim is:

1. In combination with the axle of a tractor, a pair of collars, means to clamp the collars on the axle, jaws on the collars, an implement tongue, a bar loosely carried by the tongue, for insertion between the jaws, clamps slidably carried on the bar and means on the bar to hold the clamps over the jaws.

2. A detachable coupling comprising a pair of split collars, means for clamping the collars in spaced relation on a support, each of said collars being extended to form opposed jaws, a draft bar for holding the tongue of an implement, and means slidable on the bar and holding the draft bar within the said jaws.

3. A detachable coupling comprising a pair of split collars, means for clamping the collars in spaced relation on a support, each of said collars being extended to form opposed jaws, said jaws having bends to form a recess, a draft bar for holding the tongue of an implement and means slidable on the bar for holding the draft bar within the recess of said jaws.

4. A detachable coupling comprising a pair of split collars, means for clamping the collars in spaced relation on a support, each of said collars being extended to form opposed jaws, said jaws having bends to form a recess, shoulders at the ends of the jaws, a draft bar for holding the tongue of an implement, said draft bar being insertable between the ends of the jaws and received in said recess, and means slidable on the bar and engaging said shoulders for holding the draft bar within said recess.

5. Detachable coupling comprising a pair of split collars, bolts connecting opposite ends of each collar for clamping it on a support, each of said collars being extended to form opposed jaws beyond the clamping bolts, said jaws having bends to form a recess, a draft bar for holding the tongue of an implement and means slidable on the bar for holding the draft bar within said recess.

6. A detachable coupling comprising a pair of split collars, means for clamping the collars in spaced relation on a support, each of said collars being extended to form opposed jaws, a draft bar for holding the tongle of an implement, C-clamps slidable on the bar, spaced extensions on each clamp fitting over one of the jaws, and means engageable with the bar beyond each clamp for holding the latter in engagement with a jaw.

7. A detachable coupling comprising a pair of split collars, means for clamping the collars in spaced relation on a support, each of said collars being extended to form opposed jaws, a draft bar for holding the tongue of an implement, C-clamps slidable on the bar, parallel extensions on each clamp fitting over one of the jaws, and a locking collar slidable on the bar beyond each clamp.

8. A detachable coupling comprising a pair of split collars, means for clamping the collars in spaced relation on a support, each of said collars being extended to form opposed jaws, said jaws having bends to form a recess, outwardly turned ends forming shoulders for the jaws, a draft bar, a pair of spaced collars on the bar to hold the tongue of an implement, C-clamps slidable on the bar and having parallel extensions fitting over the jaws in position to engage the shoulders, and a locking collar slidable on the bar beyond each C-clamp.

9. In a quick detachable implement connection for a tractor implement, a pair of fixed spaced opposed jaws providing shoulders adjacent the openings therebetween, a draft bar insertable between the jaws and locking members on the draft bar and having spaced portions so shaped as to be engageable about the outside of the jaws, said locking members being also engageable with said shoulders to retain the draft bar within the jaws.

10. In a quick detachable implement connection, between a tractor having an axle housing and an implement, said tractor having a wheel adjustable to points at varying distances from said axle housing, a pair of fixed spaced opposed jaws on the axle housing, a draft bar engaged between the jaws and extending beyond the end of the axle housing, means for detachably maintaining the draft bar within the jaws and a tongue engaged with the draft bar beyond the end of the axle housing so as to lie within the space between said axle housing and said wheel.

11. A detachable coupling for a tractor comprising a pair of fittings supported in spaced relation on the tractor, each of said fittings being extended to form opposed jaws, said jaws having bends to form a recess, outwardly turned ends forming shoulders for the jaws, a draft bar, a pair of spaced collars on the bar to hold the tongue of an implement, C-clamps slidable on the bar and having parallel extensions fitting over the jaws in position to engage the shoulders, and a locking collar slidable on the bar beyond each C-clamp.

12. A detachable coupling for a tractor comprising a pair of fittings supported in spaced relation on the tractor, each of said fittings being extended to form opposed jaws, said jaws having bends to form a recess, said jaws having also end portions adapted to form shoulders for the jaws, a draft bar, a pair of spaced collars on the bar to hold the tongue of an implement, means slidable on the bar and having a portion positioned in engagement with one of said shoulders for holding the draft bar within said recess, and a locking collar slidable on the bar beyond one of said slidable means for maintaining it in engagement with said shoulder.

GERALD GERALDSON.